United States Patent
Itakura et al.

(10) Patent No.: US 7,564,768 B2
(45) Date of Patent: Jul. 21, 2009

(54) RECORDING AND REPRODUCING APPARATUS

(75) Inventors: Akihiro Itakura, Kawasaki (JP);
Akiyoshi Uchida, Kawasaki (JP);
Kazushi Uno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 804 days.

(21) Appl. No.: 11/174,765

(22) Filed: Jul. 5, 2005

(65) Prior Publication Data

US 2006/0221420 A1     Oct. 5, 2006

(30) Foreign Application Priority Data

Mar. 31, 2005   (JP)   ............... 2005-102881

(51) Int. Cl.
*G11B 7/00*   (2006.01)
(52) U.S. Cl. ..................................... 369/126
(58) Field of Classification Search ............ 369/103, 369/126; 359/22, 35
See application file for complete search history.

(56) References Cited

U.S. PATENT DOCUMENTS 5,566,387 A * 10/1996 Dewald ................. 369/103
5,920,536 A * 7/1999 Campbell et al. ........... 369/103
6,816,291 B2 * 11/2004 Tanaka et al. ................ 359/22
6,894,816 B2 * 5/2005 Kang ........................... 359/35

FOREIGN PATENT DOCUMENTS

JP     11-344918    12/1999
JP     2004-158114   6/2004

* cited by examiner

*Primary Examiner*—Nabil Z Hindi
(74) *Attorney, Agent, or Firm*—Greer, Burns & Crain, Ltd.

(57) ABSTRACT

The invention is a recording and reproducing apparatus for recording data on a recording medium having a holographic recording area and a buffer recording area. The recording and reproducing apparatus has a holographic recording controller which multiplexedly records user data as page data in a holographic form on the holographic recording area, a buffer recording controller which records user data on the buffer recording area, and a recording controller, upon receiving a user data write request, which controls recording of user data in the write request on which one of the holographic recording area and the buffer recording area.

6 Claims, 8 Drawing Sheets

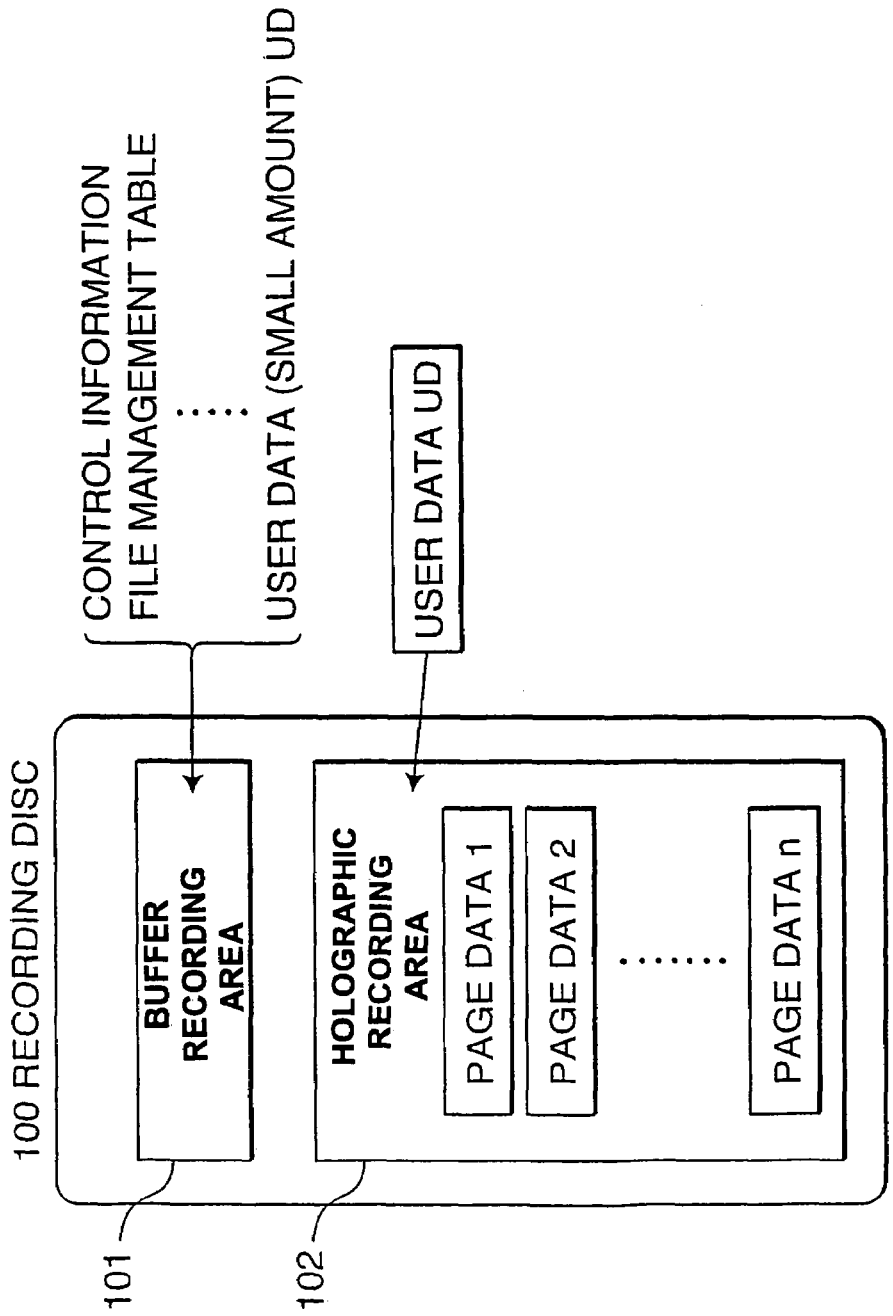

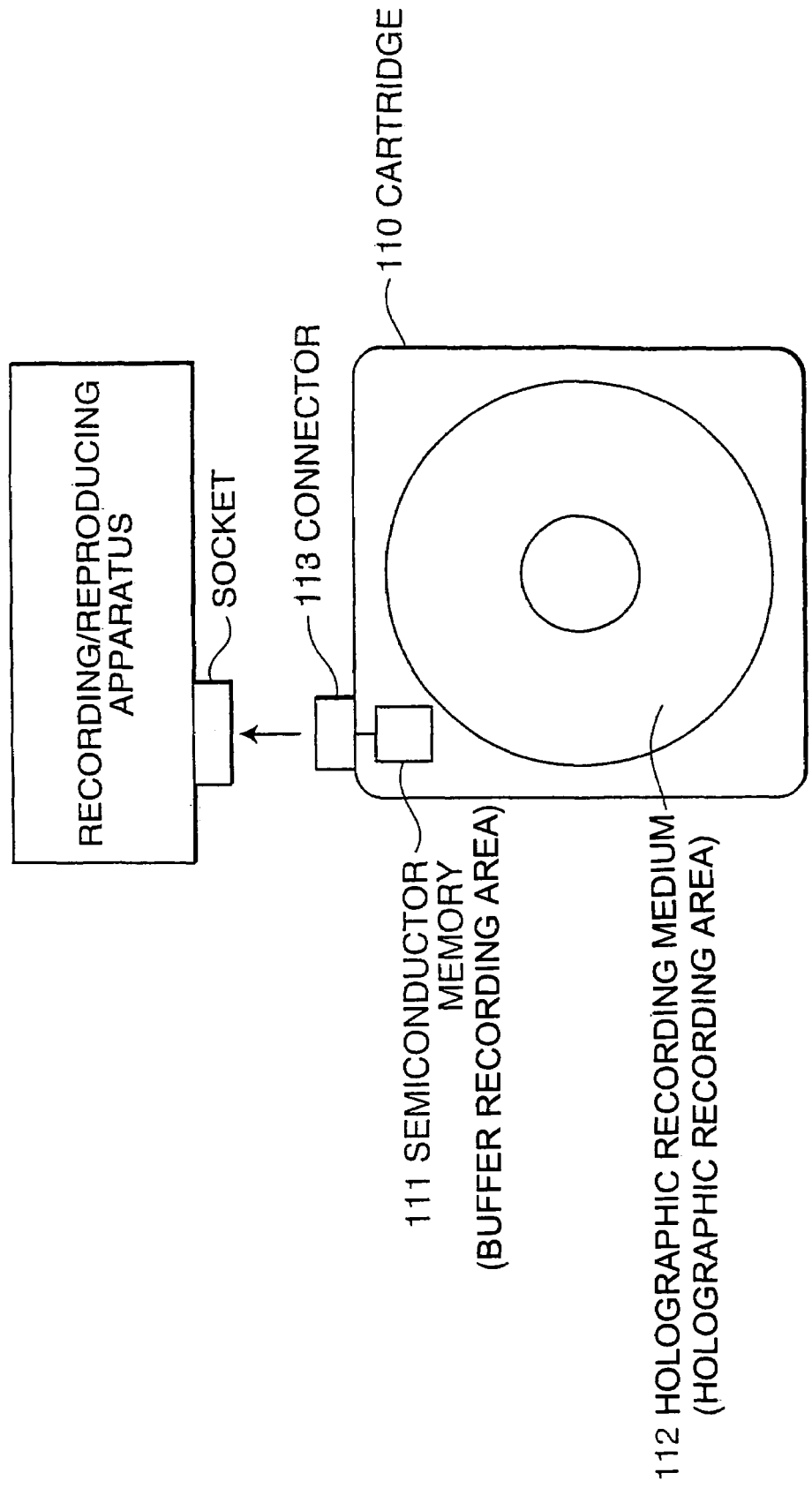

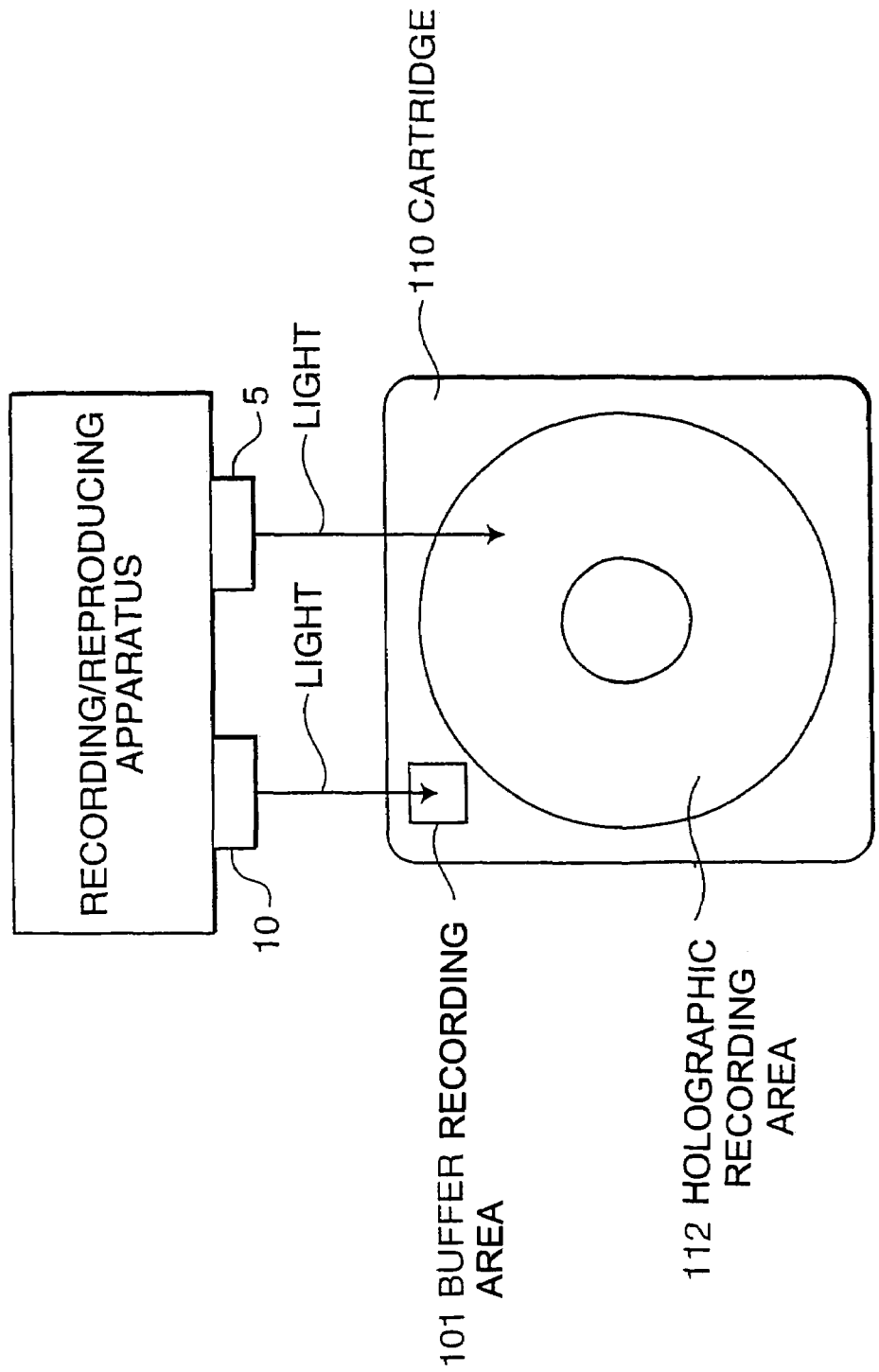

RECORDING AND REPRODUCING APPARATUS

CROSS-REFERENCE TO RELATED APPLICATIONS

This application is related to Japanese patent application No. 2005-102881 filed on Mar. 31, 2005, whose priority is claimed under 35 USC § 119, the disclosure of which is incorporated by reference in its entirety.

BACKGROUND OF THE INVENTION

1. Field of the Invention

The invention relates to a recording and reproducing apparatus and, more particularly, to a recording and reproducing apparatus for recording and reproducing a plurality of pieces of two-dimensional information to a holographic recording medium in which multiplex recording can be performed in the same physical region.

2. Description of the Related Art

A holographic recording medium is a medium capable of recording two-dimensional information of a large amount, for example, a few megabytes on a page data unit basis in the form of a hologram.

The same physical region on a medium is irradiated with information light associated with user data to be recorded and reference light, and interference fringes of the information light and the reference light are recorded. Consequently, the holographic recording medium has an advantage that a number of pieces of page data are multiplexedly recorded on the same physical region by changing, for example, an incident angle to a medium and wavelength of the reference light (see Japanese Unexamined Patent Application No. 2004-158114).

Since a large amount of user data on recorded in a single physical recording region in a medium, there is an advantage that information of a larger amount can be recorded as compared with conventional recording media such as a CD and a DVD.

As such holographic recording media, a so-called write-once medium on which information can be written only once and which cannot be rewritten, and a rewritable medium are developed.

For the purpose of reproducing information as a three-dimensional image, a holographic stereogram recording medium is used.

The holographic stereogram is obtained by recording a sequence of parallax images captured from different observation points in the horizontal direction so as to be continuous in the horizontal direction. At the time of reproduction, the images are seen like a three-dimensional image by parallax which occurs when an observer views the images.

On a medium on which such holographic stereogram is recorded, not only an image recorded as so-called write-once hologram, supplemental information such as sound information at the time of creation, creation conditions, date and time, and place is recorded (see Japanese Unexamined Patent Application No. Hei 11-344918 (1999)).

The supplemental information is recorded in a region different from that of an image by a recording method of magnetic recording, optical recording or the like.

On the holographic stereogram recording medium, a plurality of images of different view points are recorded so as to be viewed three-dimensionally. Although the supplemental information can be additionally recorded, an image itself recorded as a hologram cannot be additionally recorded and multiplex recording of user data aiming at large-amount recording cannot be performed. The supplemental information is preliminarily determined and a large amount of information such as image data cannot be newly added to the recording region of the supplemental information.

In a holographic recording medium for multiplexedly recording a large amount of user data by using information light and reference light, the minimum recording unit is a page of a few megabytes. It can be said that use efficiency of the medium is high in the case of recording user data of about the minimum recording unit.

In the case of holographic-recording document data of a small amount (tens Kbytes) of tens of pages of A4-size into one page, only a small region in one page as the minimum unit is used and the rest of the page becomes a vacant region. In spite of the large recording capacity, there is a case that the use efficiency of the medium is very low.

Due to the characteristics of the holographic recording, data cannot be additionally recorded in part of one page, and only part of data recoded in the page cannot be rewritten.

For example, in the case of rewriting only part of a page, first, all of a recorded region in the page has to be erased.

Particularly, in the case where a plurality of pieces of page data (P1, P2, . . . , and Pn) are multiplexedly recorded on the same region A, it is impossible to select and erase only one page data (for example, P2) including data desired to be rewritten. Therefore, a series of processes have to be performed in which all of the multiplexedly recorded page data (P1, P2, . . . , and Pn) is reproduced once and temporarily stored in another memory, all of the pages (P1, P2, . . . , Pn) in the region A are erased, the page data P2 is rewritten to page data P2' including desired rewrite data, and the new page data P2' and the other page data (P1, P3, . . . , and Pn) temporarily stored is re-recorded on the same region A.

That is, in the case where only data of one line in a page out of user data of a large amount such as hundreds of pages is desired to be rewritten, only the data in the line cannot be rewritten. The series of processes of reproduction, temporary recording, all erasure, data rewriting, and re-recording have to be performed on also page data which does not have to be rewritten. It takes long time to perform the rewriting process and it causes deterioration in performance of the recording function of the apparatus.

Therefore, although the process of recording and reproducing data onto/from the holographic recording medium has the advantage that a large amount of data can be recorded and reproduced at once in short time, when the medium is used in such a manner that a small amount of data is recorded or rewritten frequently, the use efficiency of the medium is low, it takes long time for rewriting, and the recording performance deteriorates.

SUMMARY OF THE INVENTION

The invention provides a recording and reproducing apparatus for recording data on a recording medium having a holographic recording area and a buffer recording area, and the recording and reproducing apparatus includes a holographic recording controller which multiplexedly records user data as page data in a holographic form on the holographic recording area, a buffer recording controller which records user data on the buffer recording area, and a recording controller, upon receiving a request writing a user data, which controls recording of user data in the write request on which one of the holographic recording area and the buffer recording area.

BRIEF DESCRIPTION OF THE DRAWINGS

FIG. 3 illustrates a schematic configuration of the recording disc of the invention;

FIG. 6 illustrates a buffer recording area according to one embodiment of the invention; and FIG. 7 illustrates the buffer recording area according to one embodiment of the invention.

DESCRIPTION OF THE PREFERRED EMBODIMENTS

Figure 1:
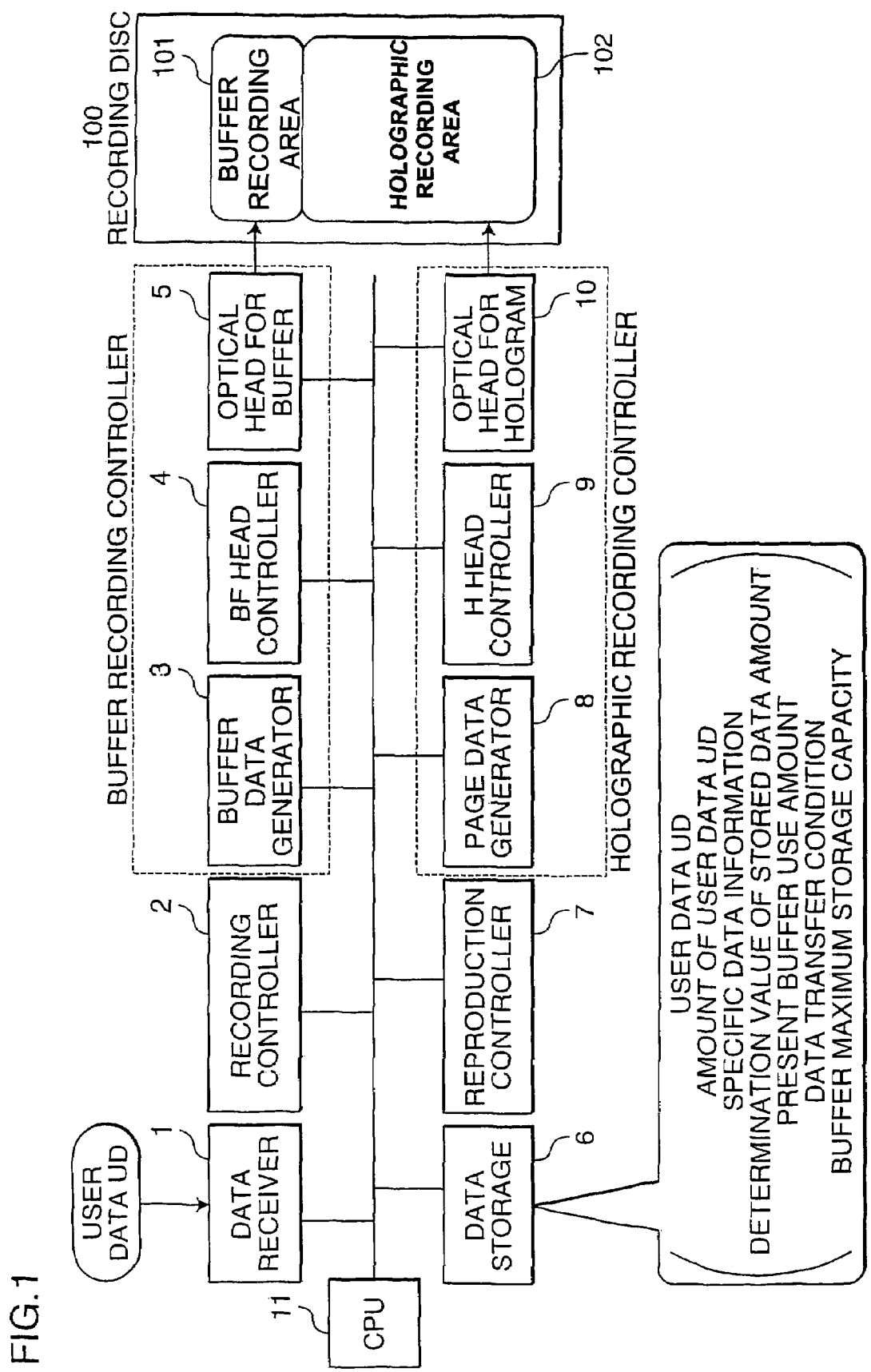
FIG. 1 is a configuration block diagram of a recording and reproducing apparatus according to one embodiment of the invention.

The invention provides a recording and reproducing apparatus with improved medium use efficiency at the time of recording and reproducing a small amount of user data on/from a holographic recording medium by providing a buffer recording area capable of performing high-speed partial recording and reproduction.

More specifically, the invention provides a recording and reproducing apparatus for recording data on a recording medium having a holographic recording area and a buffer recording area, and the recording and reproducing apparatus includes a holographic recording controller which multiplexedly records user data as page data in a holographic form on the holographic recording area, a buffer recording controller which records user data on the buffer recording area, and a recording controller, upon receiving a request writing a user data, which controls recording of user data in the write request on which one of the holographic recording area and the buffer recording area.

With this configuration, a relatively small amount of a plurality of pieces of user data is stored in the buffer recording area. If the amount of the user data is approximately equal to one page data capacity amount in a hologram, the plurality of pieces of user data are holographic-recorded as one page data. Therefore, it is possible to improve use efficiency of the holographic recording area.

In the recording and reproducing apparatus according to the invention, the recording controller includes a capacity determination unit, upon receiving a request writing a user data, which determines whether total data amount of at least an amount of data recorded on the buffer recording area and an amount of the user data in the write request is equal to a predetermined capacity value or not, and a recording region selection controller which records the user data on the buffer recording area by the buffer recording controller when the capacity determination unit determines that the total data amount is less than the predetermined capacity value, and records total data including at least data recorded on the buffer recording area and the user data in the write request in a lump onto the holographic recording area by the holographic recording controller when the capacity determination unit determines that the total data amount is equal to or larger than the predetermined capacity value.

In the recording and reproducing apparatus according to the invention, the recording controller includes a data type determination unit, upon receiving a request writing a user data, which determines whether a type of the user data in the write request is predetermined specific data or not, and a recording region selection controller which records total data including at least the user data onto the buffer recording area by the buffer recording controller when the data type determination unit determines that the type of the user data in the write request is the specific data, and records total data including at least the user data in the write request in a lump onto the holographic recording area by the holographic recording controller when the data type determination unit determines that the type of the user data in the write request is not the specific data.

In the recording and reproducing apparatus according to the invention, the buffer recording controller has either a light recording and reproducing function of recording and reproducing data by irradiating the buffer recording area with light or a magneto-optical recording and reproducing function of recording and reproducing data by simultaneously performing irradiation of light and application of a magnetic field to the buffer recording area.

With this configuration, a small amount of user data is recorded on the buffer recording area, so that it is possible to partially recording and reproducing data at a high speed and at random like the presently used CD or the like.

The buffer recording area may be an electrically rewritable nonvolatile semiconductor memory device.

With this configuration, since data can be recorded and reproduced electrically, it is unnecessary to provide an optical component used for optical recording or magneto-optical recording, leading to cost reduction and size reduction in an apparatus. It is also possible to partially rewrite a small amount of user data at a high speed in comparison with a case of recording data in a holographic form.

Further, if the user data to be recorded is less than a predetermined capacity value or is equal to the predetermined specific data, the buffer recording controller may record the user data on the buffer recording area.

In addition, the specific data may be data instructing recording to the buffer recording area, data instructing high-speed reading, or data indicative of control information of the recording and reproducing apparatus.

With this configuration, it is possible to partially record and reproduce a small amount of user data and specific data at a high speed in comparison with recording and reproduction in a holographic form.

Hereinafter, the invention will be described in detail on the basis of embodiments shown in the figures. The invention is not limited to the embodiments.

Configuration of Recording and Reproducing Apparatus of the Invention

FIG. 1 is a block diagram of a recording and reproducing apparatus according to one embodiment of the invention.

As shown in FIG. 1, the recording and reproducing apparatus of the invention mainly includes a data receiver 1, a recording controller 2, a buffer data generator 3, a BF head controller 4, an optical head 5 for buffer, a data storage 6, a reproduction controller 7, a page data generator 8, an H head controller 9, an optical head 10 for hologram, and a CPU 11.

In the invention, a medium (recording disc 100) for recording user data is constructed by a buffer recording area 101 and a holographic recording area 102. The holographic recording area 102 is a region where user data is multiplexedly recorded as page data of a holographic form. The buffer recording area 101 is a region where user data and specific data other than the user data are recorded. In the region, recording and reproduction is performed by a method other than that for a hologram.

The holographic recording area 102 is a region where recording and reproduction can be performed on a large-amount page unit basis. In contrast, the buffer recording area 101 is a region where recording and reproduction is performed in relatively small units called sectors and partial data can be rewritten at higher speed than holographic recording.

In FIG. 1, the data receiver 1 is a part for receiving user data UD from a high-order apparatus such as a personal computer. The user data UD is data including every information such as character, figure, image and sound, and is not particularly limited. The user data UD may be data of relatively small amount made of only characters such as text document, an image file of relatively large amount such as a picture, or multimedia data made of various information.

The recording controller 2 is a part for executing a process of recording the user data UD on the recording disc 100 and operates on the basis of an instruction from the CPU 11. In the invention, when there is a request for recording user data or the like, a condition determination is made to execute one of two recording processes: a buffer recording process and a holographic recording process. The buffer recording process is a process of recording data onto the buffer recording area 101 in the recording disc 100. The holographic recording process is a process of recording data as page data in a holographic form onto the holographic recording area 102. As the method of recording data onto the buffer recording area 101, any of various recording methods such as light irradiation recording, phase change recording, magneto-optical recording, magnetic field modulation recording and magnetic recording may be used. The details of the two recording processes will be described later.

The buffer data generator 3 is a part for generating data to be recorded on the buffer recording area 101 and is a part for converting the given user data UD to a form to be recorded on the buffer recording area 101 or performing addition of a parity bit, compression, and the like.

The BF head controller 4 is a part for controlling an operation of the optical head 5 for buffer on the basis of an instruction from the CPU 11. The control method varies according to the recording method. For example, the BF head controller 4 performs control on movement of the optical head 5, track servo control and focus servo control on the buffer recording area 101 on a recording disc, and control on irradiation of a light beam, application of a magnetic field, and the like.

The optical head 5 for buffer is a part for emitting a light beam and recording/reproducing data on/from the buffer recording area 101, and mainly includes optical components such as a light source and a lens group. For example, in the case where the buffer recording area 101 is a region conformed with the phase change recording method of a DVD or the like, the optical head 5 is constructed by a laser beam emitter, an objective lens, a lens actuator and the like.

In the case where the buffer recording area 101 is a region conformed with the magneto-optical recording method of an MO or the like, the optical head 5 is constructed by a laser beam emitter, an objective lens, a lens actuator, a magnetic field applying part and the like.

The buffer data generator 3, the BF head controller 4 and the optical head 5 for buffer correspond to the buffer recording controller of the invention.

The page data generator 8 is a part for generating page data to be recorded on the holographic recording area 102. The page data generator 8 processes the given user data UD into page data which can be recorded on the holographic recording area 102, adds a parity bit, compresses data, and the like.

The H head controller 9 is a part for controlling an operation of the optical head 10 for hologram on the basis of an instruction from the CPU 11.

The optical head 10 for hologram is a part for emitting a light beam and recording/reproducing page data on/from a region in the holographic recording area 102 in the recording disc 100, and is constructed mainly by a light source, a lens group including an objective lens, a mirror group, a spatial light modulator (BLM), a beam splitter, and a two-dimensional light detector.

The page data generator 8, the H head controller 9 and the optical head 10 for hologram correspond to the holographic recording controller of the invention.

In the case of performing the holographic recording process, the H head controller 9 controls so that a light beam is emitted from the light source and is split into an information beam and a reference beam by the beam splitter disposed in a light beam passing space, the information beam passes through the special light modulator, thereby generating a beam obtained by modulating the page data, and the same physical region in the holographic recording area 102 is simultaneously irradiated with the generated beam and the reference beam traveled via another route. As a result, interference of two light beams occurs in the same physical region and the page data is recorded as interference fringes.

The reproduction controller 7 is a part for executing a process of reproducing data already recorded in the recording disc 100 on the basis of an instruction from the CPU 11. The reproducing process also includes two reproducing processes: a buffer reproducing process and a holographic reproducing process. According to the recording position of requested information to be reproduced, one of the two reproducing processes is executed.

In the buffer reproducing process, desired information is read out from the buffer recording area 101 by the operations of the BF head controller 4 and the optical head 5 for buffer. In the holographic reproducing process, desired page data is read out from the holographic recording area 102 by the operations of the H head controller 9 and the optical head 10 for hologram.

The buffer reproducing process is performed by any of reproducing methods adapted to the aforementioned various recording methods. In the holographic reproducing process, a predetermined region in the holographic recording area 102 is irradiated only with the reference beam from the optical head 10 for hologram, reflection light (reproduction light) of the reference beam is detected by a two-dimensional image pickup device, and desired page data is reproduced.

The data storage 6 is constructed by a memory (RAM) for temporarily storing user data and the like, a memory (ROM, HDD) for fixedly storing a control program, setting information of the apparatus, and the like, and a rewritable memory (flash memory, HDD) for storing information which can be changed by a user with a parameter necessary for recording/reproduction.

The data storage 6 can be also used as a storage region of data generated by the buffer data generator 3 and the page data generator 8. Examples of information stored in the data storage 6 are as follows.

(1) User data UD supplied from a personal computer or the like (2) Amount of the user data UD (the number of bytes)

(3) Kind of record data (specific data information)

(4) Determination value of a storage data amount for determining which one of the two recording parts (101 and 102) to record data (5) Capacity of the presently used region in the buffer recording area 101 (present buffer use amount)

(6) Maximum storage capacity (upper limit value) of the buffer recording area 101

(7) Condition for transferring data from the buffer recording area 101 to the holographic recording area 102

The kind of record data (specific data information) denotes information indicative of data that is to be stored in the buffer recording area 101 but not in the holographic recording area 102, information indicative of data which is read at high speed or rewritten frequently, information indicative of control information on the recording/reproducing apparatus, information indicative of various setting information such as the recording method, format, compressing method and coding method, and the like.

The specific data information is used to determine which one of the buffer recording process and holographic recording process is to be performed at the time of recording supplied user data. The specific data information may be added to the user data by the user. Alternatively, the recording controller 2 may analyze the received user data UD or the information in the header portion and determine specific data information.

For example, in the case where the specific data information is clearly setting information of the apparatus, it is considered that the information may be changed and the amount of information is small. Consequently, the information is determined as specific data to be stored in the buffer recording area 101.

The CPU 11 controls operations of the functional blocks and hardware, and operates on the basis of the control program stored in the data storage 6.

The functional blocks of the data receiver 1, the recording controller 2, and the like can be realized as hardware logics. They can be also realized by a microcomputer having basic logics such as CPU, ROM, RAM, I/O controller and timer.

The details of the recording process of the invention will be described later. In the case where the amount of user data supplied from a personal computer or the like is relatively small, the buffer recording process is performed. On the other hand, in the case where a relatively large amount of user data is supplied as data to be recorded or when data is fully recorded in the buffer recording area 101 and becomes almost equal to the capacity of page data of one page, the holographic recording process is performed. As described above, by properly performing two kinds of recording processes, not only increase in the recording capacity but also improvement in use efficiency of a recording medium, and high-speed rewriting of a small amount of data can be realized.

Configuration of Recording Disc of the Invention

Figure 2:
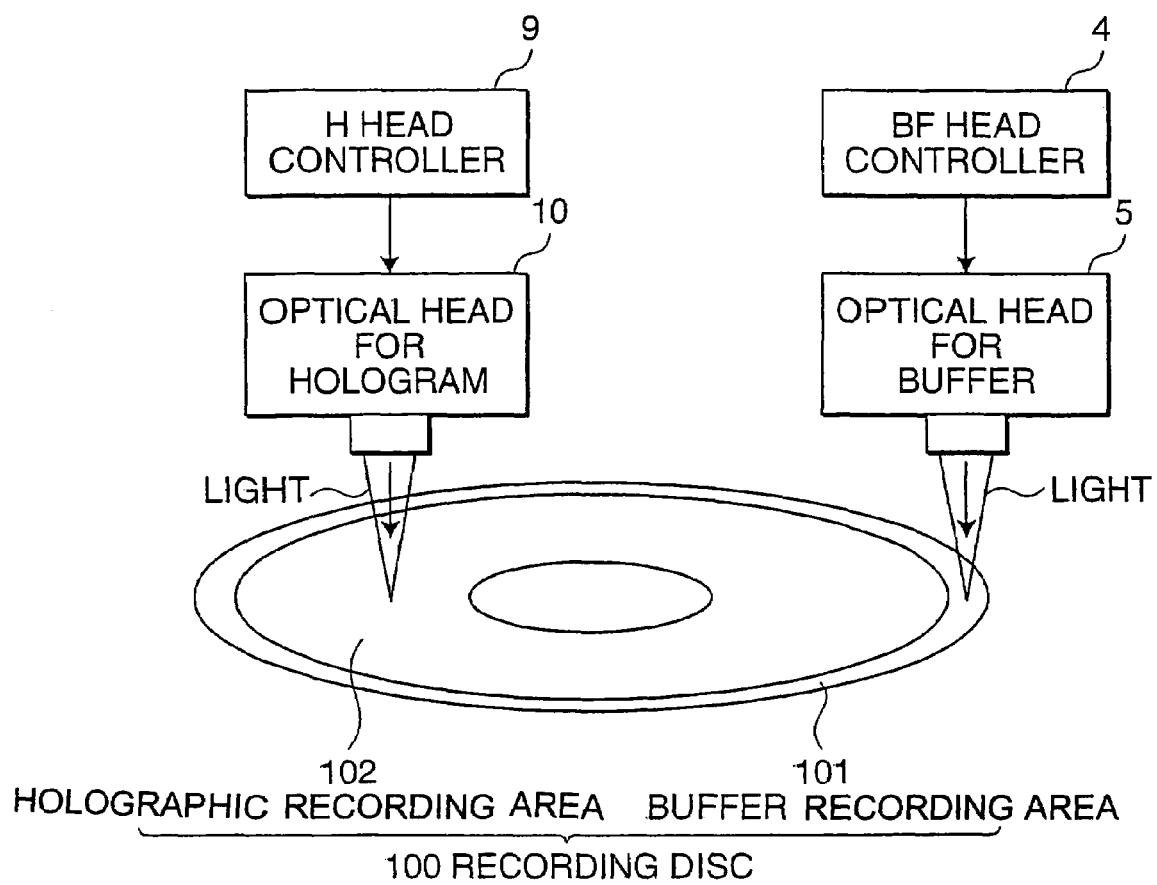
FIG. 2 illustrates recording regions in a recording disc of the invention.

FIG. 2 illustrates the schematic configuration of the recording disc according to one embodiment of the invention and a process of recording data onto two recording regions.

In FIG. 2, as the recording disc 100 according to one embodiment of the invention, a medium having a disc shape like a conventional CD is shown.

Herein, the buffer recording area 101 is provided in the vicinity of an outer peripheral portion of the disc 100, and the holographic recording area 102 is provided on the inner side of the buffer recording area of the disc.

The holographic recording area 102 is a region where a relatively large amount of user data is multiplexedly recorded. Data is recorded on/reproduced from the holographic recording area 102 by irradiating the holographic recording area 102 in the disc 100 with a light beam from the optical head 10 for hologram on the basis of an instruction from the H head controller 9.

The buffer recording area 101 is a region for recording a relatively small amount of user data or the like, and is formed by a layer configuration of a material different from that of the holographic recording area 102. For example, the buffer recording area 101 is made of a magneto-optical recording material or a phase change recording material. Data is recorded on/reproduced from such a buffer recording area 101 by irradiating the buffer recording area 101 with a light beam from the optical head 5 for buffer on the basis of the instruction from the BF head controller 4.

The configuration of the recording disc 100 of FIG. 2 is merely one embodiment; therefore, the invention is not limited to the configuration. The shape of the recording medium 100 is not limited to a disc shape but may be a rectangular or polygonal shape. The buffer recording area 101 may be provided not in the peripheral portion of the disc but in the other portion such as an inner radius region on the inside of the holographic recording area 102. Alternatively, the holographic recording area 102 may be provided on the surface of the disc, and the buffer recording area 101 may be provided on the rear surface of the disc.

FIG. 3 illustrates a schematic configuration of a recording disc of the invention.

As described above, the recording disc 100 has two regions (101 and 102). In the buffer recording area 101, control information, a file management table, a small amount of user data, or the like is recorded. On the other hand, in the holographic recording area 102, a large amount of user data is recorded on a page unit basis (page data 1, 2, . . . , n).

When a small amount of user data is stored in the buffer recording area 101 and comes to correspond to the amount of the page unit of the holographic recording area 102, some amounts of user data are recorded on/transferred to the holographic recording area 102 in a lump.

Since the capacity of the buffer recording area 101 is limited, also in the case where the use amount of the buffer recording area 101 becomes close to or is likely to exceed the maximum capacity, a plurality of small amounts of user data are constructed as one piece of page data and transferred to the holographic recording area 102 to create a vacant region in the buffer recording area 101.

The user data, specific data information, or the like designated to be recorded on the buffer recording area 101 is not transferred to the holographic recording area 102 but is updated in the buffer recording area 101.

Description of Recording Method of the Invention

Figure 4A:
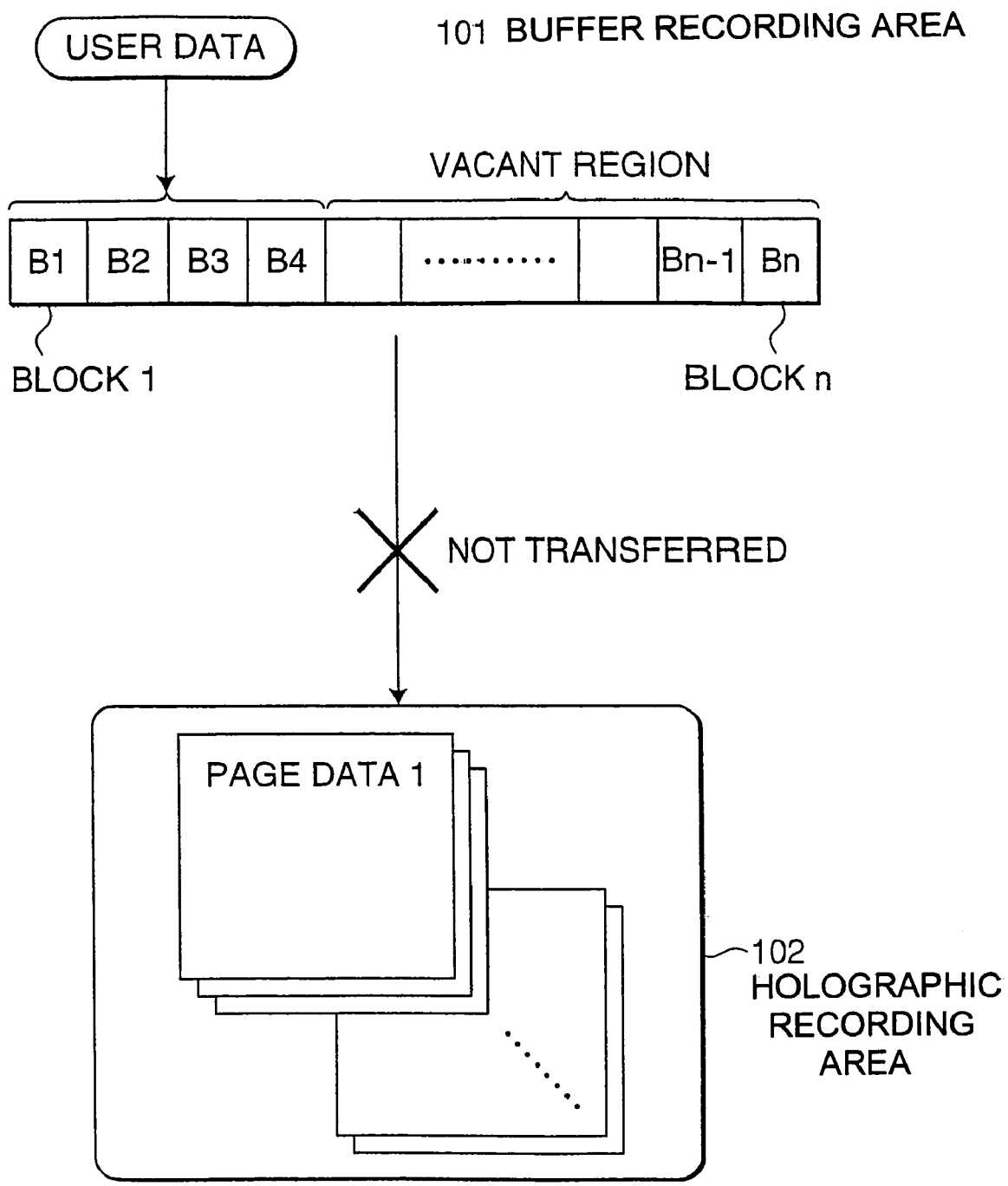
FIGS. 4A and 4B illustrate a recording method according to one embodiment of the invention.
Figure 4B:
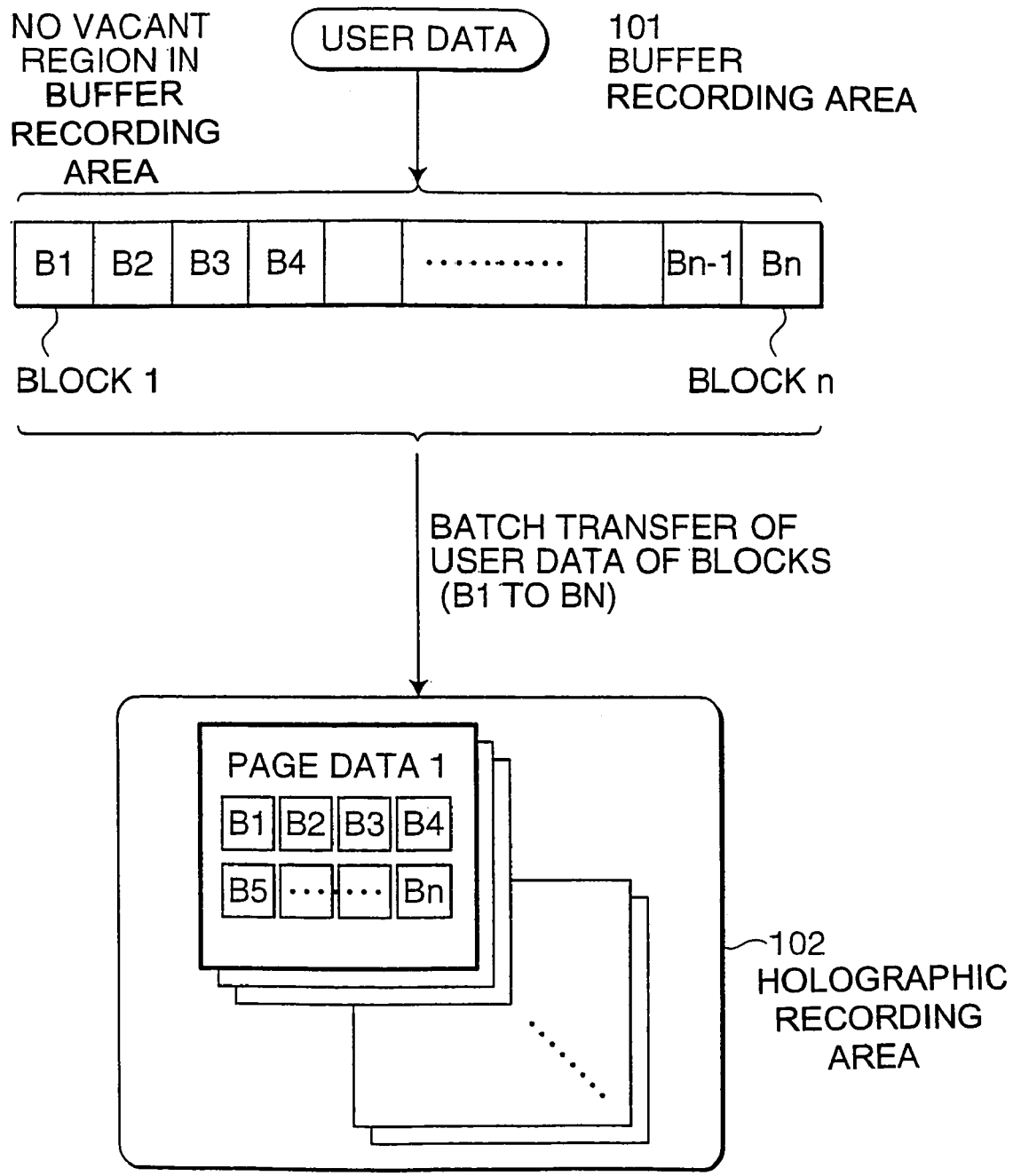

FIGS. 4A and 4B illustrate a recording method according to one embodiment of the invention.

FIG. 4A illustrates a buffer recording process and shows a case of recording user data supplied from a personal computer or the like onto the buffer recording area 101. In the case where the supplied user data to be recorded is data of a small amount relative to the recording capacity of each holographic page, user data is recorded as shown in FIG. 4A.

For example, in the case where the recording unit of one holographic page is 100 megabytes and user data A requested to be recorded is of a small amount (for example, 300 kilobytes) of 10% or less of the recording unit of one holographic page, the user data A is not directly recorded on the holographic recording area 102 but is recorded on the buffer recording area 101.

In the case where the buffer recording area 101 is constructed by "n" blocks (B1, B2, . . . , Bn) as shown in FIG. 4A, user data of a small amount to be recorded is sequentially recorded on the block unit basis.

FIG. 4A shows a state where the small amount of user data is recorded in four blocks (B1 to B4). It is assumed that the total amount (for example, one megabyte) of a plurality of pieces of user data recorded in the four blocks is sufficiently smaller than the capacity of one page data of the holographic recording area 102. Since a number of vacant regions (B5 to Bn) still exist in this state, user data is not transferred to the holographic recording area 102. In the case where a request for recording a small amount of user data is received later, the user data is recorded in a block B5 in the buffer recording area 101.

The size of a block region cannot be unconditionally determined. From the viewpoint of use efficiency of each block capacity, it is sufficient to set the size to a size which almost coincides with the maximum size of user data usually used. Since there is a case that the size of user data is determined for each user, the size of a block may be preset for each user.

In the case of recording specific data information such as a file management table on the buffer recording area 101, it is preferable to preliminarily fix a specific region (for example, Bn) as a region for recording the information.

FIG. 4B illustrates a process of transferring the user data from the buffer recording area 101 to the holographic recording area 102. The user data may not be transferred but may be copied so that the user data is left in the buffer recording area 101.

It is now assumed that all of the blocks (B1 to Bn) are filled with a plurality of pieces of user data recorded on the buffer recording area 101 and there is no vacant region in the buffer recording area 101. It is also assumed that the total capacity of the blocks B1 to Bn in the buffer recording area 101 is capacity slightly smaller than the amount of one page of page data (for example, 99%).

In this case, all of small amounts of user data recorded in the blocks B1 to Bn are combined to form one piece of page data, and the page data is transferred in a lump to one page of the holographic recording area 102. In such a manner, the page recorded in the holographic recording area 102 by the batch transfer is filled almost with user data and is recorded in a state where a vacant region hardly exists. That is, a state where the efficiency of using each page of the holographic recording area 102 on which page data is recorded is almost 100% can be realized.

As a concrete example, the case where the number "n" of blocks is set to 10 will be described. In the case of recording a small amount of user data of one block (B1) having a capacity of about 1/10 of the capacity of one holographic page not on the buffer recording area 101 but directly on the holographic recording area 102, only about 1/10 of one page data recorded is used and the remaining 90% is a vacant region. Thus, the use efficiency is very low.

On the other hand, in the case where a plurality of pieces of small amounts of user data are stored in ten blocks (B1 to B10) in the buffer recording area 101 and, at this stage, the stored user data is transferred in a lump as one-page data to the holographic recording area 102, there is hardly a vacant region for the one-page data, so that the use efficiency in page data recording is very high. Therefore, the advantage of holographic recording which can perform large-capacity recording by performing the batch transfer process of such small amounts of data can be exhibited most effectively.

The transfer of user data is performed by a series of processes of recording user data onto the holographic recording area 102 and erasing the original user data in the buffer recording area 101. In the copying process, the original user data is not erased.

FIG. 4B shows an embodiment in which when the buffer use amount at present reaches the maximum storage capacity and there is no vacant region in the buffer recording area 101, data of all of blocks (B1 to Bn) is transferred in a lump. The invention, however, is not limited to the embodiment.

The conditions for transferring a plurality of pieces of user data stored in the buffer recording area 101 to the holographic recording area 102 in a lump are as follows.

(a) There is no vacant region in the buffer recording area 101.

(b) The buffer use amount at present is almost equal to or slightly smaller than the amount value of one-page data of hologram.

(c) The buffer use amount at present exceeds a preset buffer use amount or preset number of blocks.

(d) The buffer use amount at present exceeds the amount value of one page of hologram.

Any one of the conditions, some of the conditions, or all of the conditions may be employed. The condition(s) to be employed may be preset or selected by the user.

Herein, the buffer use amount at present denotes the total amount of the plurality of pieces of user data recorded on the buffer recording area 101.

In the case of (d), user data of an amount which almost corresponds to one holographic page is selected or designated and is transferred.

Whether user data requested to be recorded is recorded on the buffer recording area 101 or not is determined not only on the basis of the size of the data.

Examples of the condition of determining whether user data requested to be recorded is recorded on the buffer recording area 101 or not are as follows.

(A) The amount of user data requested to be recorded is to be smaller than a determination value (capacity) of a predetermined storage data amount.

(B) The kind of user data requested to be recorded is to be included in predetermined specific data information. The kind of user data is determined by, for example, identification information ID included in the user data as will be described later.

For example, the identification information ID indicating that high-speed recording/reproduction is requested is given to user data, the user data (specific data) to which the identification information ID is given is always recorded on the buffer recording area 101, and transfer of the user data onto the holographic recording area 102 is inhibited.

Embodiment of Process of Recording Data to Hologram and Buffer

Figure 5:
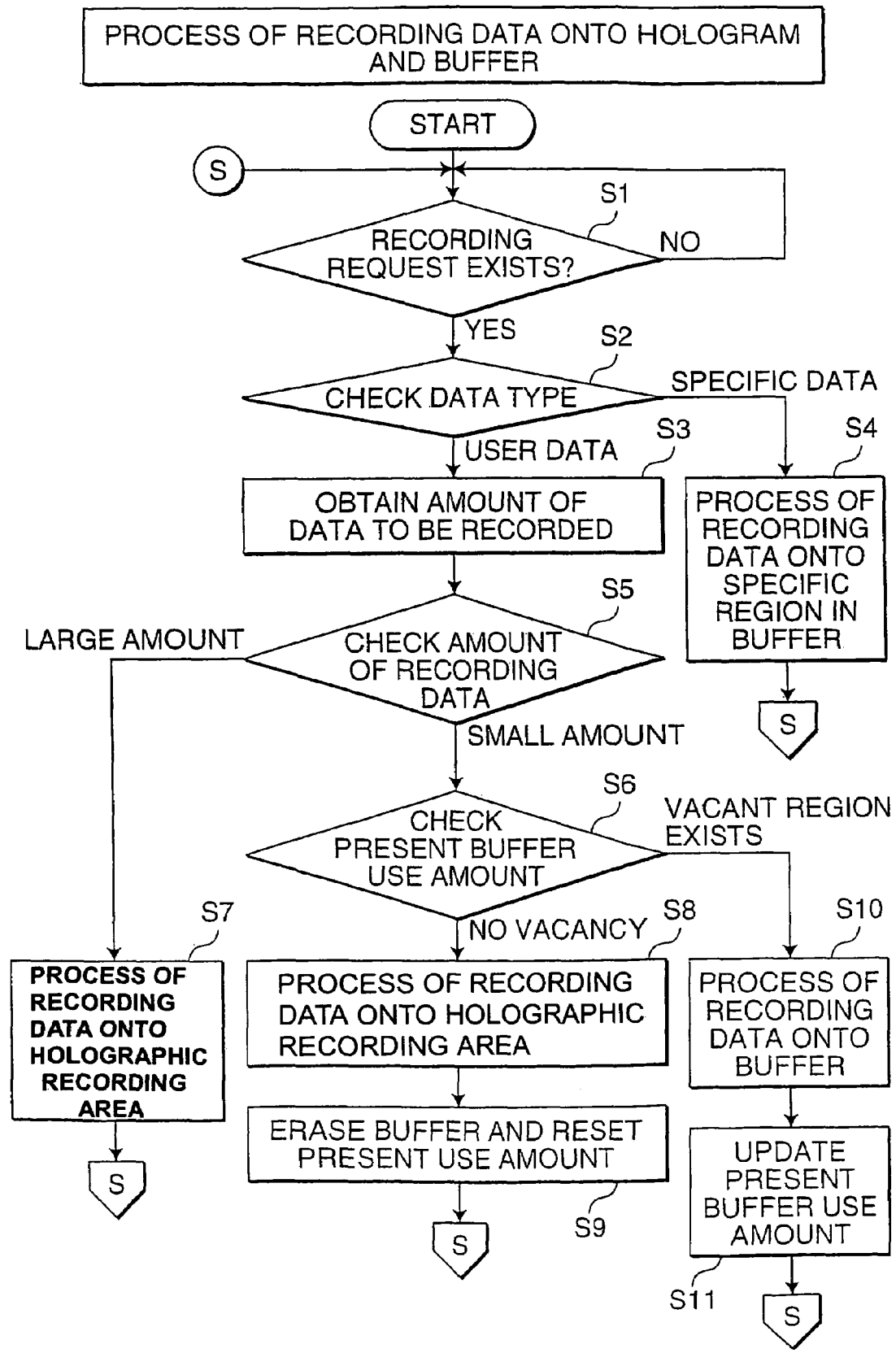
FIG. 5 is a flowchart of a process of recording data onto a hologram and a buffer of the invention.

FIG. 5 is a flowchart showing the holographic recording process and the buffer recording process according to one embodiment of the invention.

In step S1, a check is always made to see whether there is a user data recording request from a personal computer or not. If YES, the program advances to step S2.

In step S2, the details and the kind of the user data requested to be recorded are checked. For example, when any of identification information ID1 indicating that storage of user data into the holographic recording area 102 is prohibited, identification information ID2 indicating that user data is frequently read at high speed, or identification information ID3 indicative of control information (such as optimum recording and reproduction condition data) regarding the recording and reproducing apparatus is given to user data, the user data is determined as specific data, and the program advances to step S4.

In the case where no identification information ID is given to user data or identification information ID4 indicating that the user data is to be recorded on the holographic recording area 102 is given to user data, the user data is determined as normal user data, and the program advances to step S3.

In step S4, a buffer recording process is performed. Specifically, the specific data requested to be recorded is recorded on a specific region in the buffer recording area 101. At this time, as shown in FIGS. 1 and 2, the recording controller 2 executes a recording process by using the functional blocks (3, 4 and 5) used for buffer recording. After step S4, the program returns to step S1 so as to be ready for the next recording request. As described above, specific data is always recorded on the buffer recording area 101, so that it can be partially reproduced at high speed in units smaller than the hologram.

In step S3, the amount of the user data requested to be recorded is obtained or calculated. In step S5, whether the amount of the record data exceeds a predetermined value or not is determined. The predetermined value is an amount of data preliminarily recorded in the data storage 6 and corresponds to a determination value of the storage data amount.

For example, when the amount of one page data in the holographic recording area 102 is R megabytes, 0.8 R is set and recorded as a determination value. In this case, whether the amount of user data requested to be recorded exceeds 80% of the amount R of one page data or not is determined in step S5.

User data exceeding 0.8 R is determined as data of a large amount and the program advances to step S7. In the case where the user data requested to be recorded is smaller than 0.8 R, the user data is determined to be data of a small amount, and the program advances to step S6. The determination value used in step S5 is not limited to the value. Except for the case where the determination value is fixedly preset, the determination value can be changed by the user.

In step S6, the present buffer use amount in the buffer recording area 101 is checked.

As an example, in the case where there is no vacancy in the buffer recording area 101 as shown in FIG. 4B, the program advances to step S8. When there is a vacancy, the program advances to step S10.

In step S10, in a manner similar to step S4, the process of recording data onto the buffer is performed. As shown in FIG. 4A, user data of a small amount is recorded in vacant blocks in the buffer recording area 101. In step S11, the present buffer use amount is updated, and the program returns to step S1.

The rewrite unit of the small amount of user data recorded on the buffer recording area 101 is smaller than that of page data. In the case of rewriting, unlike page data recorded in the hologram, it is unnecessary to perform the series of processes (reproduction, temporary storage, all erasure, data rewriting and re-recording), and high-speed reproduction and high-speed rewriting can be performed.

In steps S7 and S8, the process of recording user data onto the holographic recording area 102 is performed.

In the case of user data determined as user data of a large amount in step S5, the user data is constructed as one piece of page data and the page data is recorded in a vacant region in the holographic recording area 102 in step S7. After that, the program returns to step S1.

When it is determined in step S6 that there is no vacant region in the buffer, in step S8, one or a plurality of pieces of user data corresponding to the amount of one page data, in the blocks recorded in the buffer recording area 101 is/are constructed as one page data and recorded on the holographic recording area 102. When the total amount of all of the blocks is smaller than the amount of one page, the data of all of the blocks is constructed as data of one page and recorded.

Since the user data stored in the buffer recording area 101 is recorded onto the holographic recording area 102, in step S9, the data in the blocks in the buffer recording area 101 is erased and the present buffer use amount is reset to zero or the minimum amount. After that, the program returns to step S1. By steps S8 and S9, the transfer process as shown in FIG. 4B is performed. In the case where the copying process is performed instead of the transfer process, step S9 is unnecessary.

By such a recording process, in both of the case where the amount of the user data requested to be recorded is large and the case where the amount is small, user data of the amount close to the amount of holographic page data is recorded as one-page data on the holographic recording area. Thus, the use efficiency of the holographic recording area 102 can be improved.

Buffer Recording Area According to Another Embodiment of the Invention

FIG. 6 illustrates a buffer recording area 101 according to another embodiment of the invention.

FIG. 6 shows a cartridge 110 having a holographic recording medium 112 corresponding to the holographic recording area 102 of the invention and a semiconductor memory 111 corresponding to the buffer recording area 101. That is, the figure shows an example of a portable recording disc.

Although the holographic recording medium 112 is a disc-shaped disc in FIG. 6, the holographic recording medium 112 may have another shape such as a rectangular shape. The medium 112 is a medium having a surface on all of which holographic recording can be performed.

On the other hand, the semiconductor memory 111 is an electrically rewritable nonvolatile semiconductor memory device such as a flash memory, MRAM or FRAM. In this case, therefore, the components, such as the BF head controller 4 and the optical head 5 for recording and reproducing data on/from the buffer recording area 101 as shown in FIG. 2, are unnecessary. However, in order to electrically record and reproduce data, a connector 113 has to be provided as an I/O interface. The shape, electrical specifications, physical specifications and the like of the connector 113 are not particularly limited but can be arbitrary. For example, a connector having specifications and an equivalent shape as those of the USB connector or IEEE1394 connector usually used may be used.

The position at which the semiconductor memory 111 is provided and the position at which the connector 113 is provided are not also particularly limited. They may be provided at positions so as not to disturb recording and reproduction of data on/from the holographic recording medium 112.

For example, the semiconductor memory 111 may be provided on the rear surface in the cartridge or integrally provided in the cartridge itself.

As shown in FIG. 6, the recording and reproducing apparatus of the invention is provided with a mechanism for attaching a portable recording disc cartridge and a socket into which the connector 113 is inserted.

As described above, in the case of using the semiconductor memory 111 as the buffer recording area 101 on the portable medium side, it is unnecessary to provide precision components requiring relatively large space such as the optical head 5 shown in FIGS. 1 and 2. Thus, the cost and size of the recording and reproducing apparatus can be reduced.

As shown in FIG. 7, in addition to the holographic recording medium, a recording region dedicated as the buffer recording area 101 may be provided in the cartridge. The buffer recording area 101 may take the form of a small disc-shaped disc. In order to record data on the dedicated recording region, it is sufficient to irradiate the recording region with a light beam as shown in FIGS. 1 and 2.

For the buffer recording area 101, as shown in FIG. 2, the light emission direction may be set to the same as that of holographic recording, and the recording surface of the buffer recording area 101 may be provided on the same side as that of the holographic recording area 102. It is also possible to set the light emission direction opposite to that of holographic recording and set the recording surface of the buffer recording area 101 on the side opposite to the holographic recording surface.

As described above, by forming the recording medium having the buffer recording area and the holographic recording area, data written in the buffer recording area by an apparatus can be reproduced by another apparatus.

In addition, at the time of removing the medium from a recording apparatus, the medium can be removed without executing a process of copying data written in the buffer into the holographic recording area. Thus, the speed of response of the process of removing the medium from the apparatus can be improved.

According to the invention, when a plurality of pieces of user data temporarily recorded on the buffer recording area becomes approximately equal to the capacity value of page data, the user data is recorded onto the holographic recording area in a lump. Thus, improvement in use efficiency of the holographic recording area and higher-speed partial recording and reproduction of a small amount of user data can be realized.

What is claimed is:

1. A recording and reproducing apparatus for recording data on a recording medium having a holographic recording area and a buffer recording area, comprising:
 a holographic recording controller which multiplexedly records user data as page data in a holographic form on the holographic recording area;
 a buffer recording controller which records user data on the buffer recording area; and
 a recording controller, upon receiving a request writing a user data, which controls recording of user data in the write request on one of the holographic recording area and the buffer recording area, wherein
 the recording controller includes:
 a capacity determination unit, upon receiving a request writing a user data, which determines whether total data amount of at least an amount of data recorded on the buffer recording area and an amount of the user data in the write request is equal to a predetermined capacity value or not; and
 a recording region selection controller which records the user data on the buffer recording area by the buffer recording controller when the capacity determination unit determines that the total data amount is less than the predetermined capacity value, and records total data including at least data recorded on the buffer recording area and the user data in the write request in a lump onto the holographic recording area by the holographic recording controller when the capacity determination unit determines that the total data amount is equal to or larger than the predetermined capacity value.

2. A recording and reproducing apparatus for recording data on a recording medium having a holographic recording area and a buffer recording area, comprising:
 a holographic recording controller which multiplexedly records user data as page data in a holographic form on the holographic recording area;
 a buffer recording controller which records user data on the buffer recording area; and
 a recording controller, upon receiving a request writing a user data, which controls recording of user data in the write request on one of the holographic recording area and the buffer recording area, wherein
 the recording controller includes:
 a data type determination unit, upon receiving a request writing a user data, which determines whether a type of the user data in the write request is predetermined specific data or not; and
 a recording region selection controller which records total data including at least the user data onto the buffer recording area by the buffer recording controller when the data type determination unit determines that the type of the user data in the write request is the specific data, and records total data including at least the user data in the write request in a lump onto the holographic recording area by the holographic recording controller when the data type determination unit determines that the type of the user data in the write request is not the specific data.

3. The recording and reproducing apparatus according to claim 1 or 2, wherein
 the buffer recording controller has a light recording and reproducing function of recording and reproducing data by irradiating the buffer recording area with light.

4. The recording and reproducing apparatus according to claim 1 or 2, wherein
 the buffer recording area is an electrically rewritable non-volatile semiconductor memory device.

5. The recording and reproducing apparatus according to claim 2, wherein
 the specific data is data instructing recording to the buffer recording area, data instructing high-speed reading, or data indicative of control information of the recording and reproducing apparatus.

6. The recording and reproducing apparatus according to claim 1 or 2, wherein
 the buffer recording controller has a magneto-optical recording and reproducing function of recording and reproducing data by simultaneously performing irradiation of light and application of a magnetic field to the buffer recording area.

* * * * *